United States Patent [19]

Jones

[11] Patent Number: 5,037,871
[45] Date of Patent: Aug. 6, 1991

[54] PROTECTIVE OVERCOAT COMPOSITIONS AND PHOTOGRAPHIC ELEMENTS CONTAINING SAME

[75] Inventor: Raymond T. Jones, Webster, N.Y.

[73] Assignee: Eastman Kodak Company, Rochester, N.Y.

[21] Appl. No.: 527,408

[22] Filed: May 23, 1990

[51] Int. Cl.$^5$ .......................... C08K 5/54; G03C 1/76
[52] U.S. Cl. ................................. 524/261; 524/269; 524/382; 524/366; 524/398; 524/399; 430/534; 430/536; 430/961; 430/523
[58] Field of Search ............... 524/269, 261, 382, 366, 524/398, 399; 430/961, 534, 536, 523

[56] References Cited

U.S. PATENT DOCUMENTS

| | | | |
|---|---|---|---|
| 2,720,468 | 10/1955 | Shacklett | 117/34 |
| 3,429,846 | 2/1969 | Bechtold et al. | 260/29.6 |
| 3,971,872 | 7/1976 | LeBoeuf | 428/412 |
| 4,049,868 | 9/1977 | Laurin et al. | 428/412 |
| 4,293,606 | 10/1981 | Zollinger et al. | 428/203 |
| 4,741,992 | 5/1988 | Przezdziecki | 430/523 |
| 4,828,971 | 5/1989 | Przezdziecki | 430/531 |

OTHER PUBLICATIONS

Dupont Product Information Bulletin, "Zonyl Fluorosurfactants".
Hackh's Chemical Dictionary, 4th ed., Grant J., p. 611.
Websters 9th Collegiate Dictionary, 1990, p. 1001.

Primary Examiner—Paul R. Michl
Assistant Examiner—Christopher P. Rogers
Attorney, Agent, or Firm—L. George Legg

[57] ABSTRACT

Protective overcoat compositions and photographic elements containing same comprise:
 (a) a water-soluble hydroxylated polymer;
 (b) a hydrolyzed metal lower alkoxide or mixtures thereof and wherein when said hydrolyzed metal lower alkoxide is a tetrafunctional silicon lower alkoxide said hydrolyzed metal lower alkoxide comprises a mixture of said tetrafunctional silicon lower alkoxide with another hydrolyzed metal lower alkoxide that is not a tetrafunctional silicon lower alkoxide; and
 (c) a fluoroalkyl polyether surface active agent. The overcoat is transparent and flexible and provides protection against scratches and abrasion.

26 Claims, No Drawings

PROTECTIVE OVERCOAT COMPOSITIONS AND PHOTOGRAPHIC ELEMENTS CONTAINING SAME

FIELD OF THE INVENTION

This invention relates in general to photography and in particular to compositions for protective treatment of photographic elements. More specifically, this invention relates to photographic elements, such as still films, motion picture films, print films, microfiche, and the like, to which a coating composition has been applied to provide a protective overcoat layer as protection against scratching or abrasion.

BACKGROUND OF THE INVENTION

Photographic elements having protective overcoat layers are well known and a wide variety of different coating compositions have been proposed in the past for use as protective overcoats. Such overcoats serve a number of different purposes, such as to provide protection against fingerprints, abrasion and scratching, to protect against water spotting, to provide a particular surface texture such as a matte surface, to provide protection against blocking, and to act as anti-reflection layers which reduce glare. Layers of a temporary nature which are intended to be removed after they have served their purpose and layers which are permanently bonded to the photographic element have been described in the prior art. Protective overcoats can be applied to photographic elements by coating solutions or dispersions of film-forming agents in organic solvents such as are described, for example, in U.S. Pat. Nos. 2,259,009; 2,331,746; 2,706,686; 3,113,867; 3,190,197 and 3,415,670; by coating of aqueous film-forming compositions such as are described, for example, in U.S. Pat. Nos. 2,173,480; 2,798,004; 3,502,501 and 3,733,293; by coating of compositions containing discrete, transparent, solid particles of submicroscopic size as described in U.S. Pat. No. 2,536,764; by coating of plasticized polymer compositions as described in U.S. Pat. No. 3,443,946; by coating of polymerized perfluorinated olefins as described in U.S. Pat. No. 3,617,354; and by lamination of a protective layer as described, for example, in U.S. Pat. Nos. 3,397,980 and 3,697,277.

Many of the compositions used in the past to form protective overcoats on photographic elements have suffered from disadvantages which have greatly limited their usefulness. For example, it has been particularly difficult to formulate compositions which are fully satisfactory in providing abrasion and scratch resistance for photographic elements which are commonly subjected to severe conditions in handling and use, such as microfiche and motion picture films. Abrasion is particularly a problem because in all stages of preparation, use and development the film contacts other objects such as rollers and the like. For example, in motion picture film the film contacts various elements in the projection apparatus capable of abrading the film as a result of the contact. Protective overcoats for photographic elements must furthermore meet exacting requirements with respect to factors such as transparency and flexibility as well as abrasion resistance and scratch resistance, and must be very strongly bonded to the underlying material to avoid the possibility of delamination. Protective overcoats for photographic elements must also contain a sufficiently high percentage of solids to provide the desired protective characteristics but also have a sufficiently low viscosity to be coatable by machine methods such as roll coating.

While the coating compositions of the aforesaid patents represent an advance in the art of providing protective overcoats for photographic elements, still further improvement in such compositions would be highly desirable. It would be particularly advantageous to provide a coating composition which exhibits excellent adhesion toward processed photographic emulsion layers and toward all of the various types of support materials commonly used for photographic elements, for example, the cellulose acetate support materials and the polyester support materials. A problem can occur, however, in providing a coating composition capable of overcoating a surface with sufficient coverage of solids to provide the desired abrasion and scratch resistance while having a viscosity low enough to be coatable by various machines and processes. It would be particularly advantageous for the coating composition to be applicable to the element by a number of means, for example, by dip coating, roll coating, gravure coating, and the like.

SUMMARY OF THE INVENTION

The present invention is directed toward an improved coating composition that is especially useful for forming protective overcoats on photographic elements which overcoats are transparent and flexible and exhibit improved abrasion and scratch resistance.

In particular, this invention provides a photographic element comprising (a) a support, (b) at least one image-forming layer on the support, and (c) a protective layer overlying the image-forming layer, the support side, or both sides. The protective layer comprises (a) a water-soluble hydroxylated polymer cross-linked by a hydrolyzed lower alkoxide or mixtures thereof and wherein when said hydrolyzed lower alkoxide is a tetrafunctional silicon lower alkoxide said hydrolyzed lower alkoxide comprises a mixture of said tetrafunctional silicon lower alkoxide with another hydrolyzed lower alkoxide that is not a tetrafunctional silicon lower alkoxide and (b) a fluoroalkyl polyether surface active agent.

Further, this invention includes within its scope the novel aqueous coating composition useful in preparing the aforesaid photographic element. Such coating composition comprises (a) a water-soluble hydroxylated polymer, (b) a hydrolyzed metal lower alkoxide or mixtures thereof and wherein when said hydrolyzed lower alkoxide is a tetrafunctional silicon lower alkoxide said hydrolyzed lower alkoxide comprises a mixture of said tetrafunctional silicon lower alkoxide with another hydrolyzed lower alkoxide that is not a tetrafunctional silicon lower alkoxide and (c) a fluoroalkyl polyether surface active agent.

DETAILED DESCRIPTION OF THE INVENTION

The elements of this invention are radiation sensitive photographic elements capable of recording an image upon exposure to radiation. The coating compositions described herein can be used to provide protective overcoats in many different types of photographic elements. For example, the photographic elements can be still films, motion picture films, paper prints, or microfiche. They can be black-and-white elements, color elements formed from a negative in a negative-positive process, or color elements formed directly by a reversal process. The photographic elements can comprise any of a wide variety of supports. Typical supports include cellulose nitrate film, cellulose ester films including cellulose triacetate film, poly(vinyl acetal) film, polystyrene film, poly(ethylene terephthalate) film, polycarbonate film, glass, metal, paper, polymer-coated paper, and the like. The image-forming layer or layers of the element typically comprise a radiation-sensitive agent, e.g. silver halide, dispersed in a hydrophilic water-permeable colloid. Suitable hydrophilic vehicles include both naturally-occurring substances such as proteins, for example, gelatin, gelatin derivatives, cellulose derivatives, polysaccharides such as dextran, gum arabic, and the like, and synthetic polymeric substances such as water-soluble polyvinyl compounds like poly(vinyl pyrrolidone), acrylamide polymers, and the like. A particularly common example of an image-forming layer is a gelatino/silver halide emulsion layer, and the compositions described herein provide excellent results in providing protective overcoats for such emulsion layers.

In a particular embodiment of the present invention, the protective overcoat is applied only to the image-bearing side of the photographic element. In a particularly preferred embodiment of the present invention, the protective overcoat is applied only to the support side of the element. In another embodiment of the present invention, the protective overcoat is applied to both sides of the element. It may be desirable, when practicing embodiments of the invention that include coating the image-bearing side of the photographic element, to apply the protective coating after photographic processing of the exposed film to facilitate contact of the processing solutions with the emulsion layer or layers. It may also be desirable prior to applying the coating composition when practicing any embodiments of the invention to subject the underlying surface to corona discharge treatment in accordance with techniques known in the art. Also within the scope of the present invention, the protective overcoat may be applied to the support side of the photographic element after other coatings such as antistatic layers have been applied to the support side of the photographic element. Subbing layers suitable for promoting adhesion of the various layers may be employed in accordance with the common knowledge known in the art, especially that taught in U.S. Pat. Nos. 2,678,235; 2,627,088, 2,703,290; 2,794,742; 2,852,378 and 2,943,937.

The first essential ingredient in the coating compositions employed in the practice of this invention is a water-soluble hydroxylated polymer which acts as a binder polymer, for example, acrylamide polymers, water soluble cellulose derivatives, such as water soluble cellulose acetate, and hydroxy ethyl cellulose acetate and the like. It is important that the water-soluble hydroxylated polymer be compatible with the hydrolyzed metal lower alkoxide.

Particularly preferred are water-soluble hydroxylated polymers having from about 10 to about 40 percent of hydroxyl containing monomer, and polyvinyl alcohol is most preferred.

The second essential ingredient of the coating composition is a hydrolyzed lower alkoxide or mixtures thereof which serves as a cross-linking agent. Methods of preparation of hydrolyzed lower alkoxides are known in the organic synthesis art. One such method, of preparing polysilicic acid, is described in U.S. Pat. No. 4,741,992.

A problem of precipitation of the coating composition from the coating solution containing the fluroalkyl polyether surface active agent can occur if the hydrolyzed lower alkoxide is a tetrafunctional silicon lower alkoxide unless it is used in mixture with another hydrolyzed lower alkoxide that is not a tetrafunctional silicon lower alkoxide. A preferred such mixture comprises a hydrolyzed lower alkoxide that is not a tetrafunctional silicon lower alkoxide in a weight proportion of 5 mole percent of such mixture also containing the tetrafunctional silicon lower alkoxide.

Suitable lower alkoxides that may be employed in the coating compositions of the invention include, for example, tetraethylorthosilicate, tetrabutylorthosilicate, tetraethylorthotitanate, tetrabutylorthotitanate, methyltriethoxysilane, methyltriethylorthotitanate, phenyltriethoxysilane, phenyltriethylorthotitanate, tetrapropoxysilane, and the like. In addition to the alkoxides set forth above, the alkoxides of metals such as germanium, aluminum, zirconium, boron, tin and the like may also be employed. A preferred coating composition comprises a mixture of methyltriethoxysilane, tetraethylsilane, and tetrabutyl titanate, and particularly preferred is such preferred mixture having a concentration of methyltriethoxysilane of from about 5 mole percent to about 30 mole percent. The cross-linking agent may be employed in an amount of from about 0.5 parts to about 1.5 parts to 1 part of water-soluble hydroxylated polymer depending upon the degree of cross-linking desired in the final coated layer. The cross-linking agent is preferably used in an amount of from about 0.75 parts to about 1.25 parts to one part of the water-soluble hydroxylated polymer by weight.

The third essential ingredient of the coating composition is a fluoroalkyl polyether surface active agent. By "fluoroalkyl polyether surface active agent" is meant a surfactant containing totally fluorine substituted aliphatic moieties containing six to sixteen carbon atoms wherein the aliphatic moiety may contain mixtures of aliphatic chains varying from six to sixteen carbon atoms and a polyether moiety wherein the polyether chain varies from nine to fourteen ether linkages, and includes varying lengths of polyether linkages within the length of from nine to fourteen. The polyether moiety may include polyethylene or polypropylene segments. The fluoroalkyl polyether surface active agent may be a polymer containing both fluorinated hydrocarbon segments wherein all of the hydrogens have been replaced by fluorine and polyether segments wherein the alkyl chain of the polyether will be made up from either ethylene or propylene. Preferably, the fluoroalkyl polyether surface active agents are compounds or mixtures of compounds having the formula

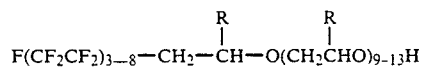

where R is hydrogen or methyl. A particularly preferred fluoroalkyl polyether surface active agent is one sold under the name Zonyl FSN by DuPont Company.

The fluoroalkyl surface active agent should be employed in an amount from about 0.01 to about 0.1 percent by weight based on the weight of the coating composition. A preferred use is in an amount of about 0.04 to about 0.06 percent by weight based on the weight of the coating composition.

Coating of the photographic element with the coating composition of this invention can be carried out in any convenient manner. For example, it can be carried out by dip coating, roll coating, gravure coating, extrusion coating, bead coating, curtain coating, use of wire wound coating rods, and so forth. The compositions in accordance with this invention may be applied in any suitable coverage based on the dry weight of the composition and preferably in a coverage from about 5 (53.82) to about 200 (2152.78) milligrams per square foot (milligrams per square meter). Most preferably, the coverage in accordance with the invention should be from about 75 (807.3) to about 125 (1345.5) milligrams per square foot (Milligrams per square meter). The viscosity of the coating composition must be sufficiently low to permit coating by processes such as roll coating but the solids content sufficiently high for sufficient abrasion and scratch resistance upon drying and curing. The optimum viscosity will depend on other factors as well, such as the type of element being treated, the optimum layer thickness, and the method of application of the composition. Typically, viscosities in the range from about 1 to about 100 centipoises are useful for this purpose, with the preferred range being from about 1 to about 50 centipoises, and the most preferred range being from about 1 to about 10 centipoises.

Subsequent to application in the desired location with respect to the structure of the radiation sensitive recording element, the coating composition layer is subjected to curing which transforms the aqueous coating composition into a permanent protective layer that is highly abrasion and scratch resistant. In the curing, temperatures of from about 25° C. to about 200° C. are typically employed. Preferably, a temperature from about 80° C. to about 140° C. and a curing time of about 1 to 5 minutes are employed.

The coating compositions described herein particularly adhere strongly to the support side of photographic elements and accordingly are particularly effective in providing protective overcoats on the support side. They are effective in providing adhesion to materials with which it is ordinarily difficult to achieve adhesion, such as the cellulose triacetate or poly(ethylene terephthalate) which are commonly used as support materials for photographic elements and the gelatino-/silver halide emulsion layers or gelatin protective layers commonly employed on the image-bearing side of photographic elements. Drying and curing of the coating composition to a transparent, flexible, abrasion and scratch resistant polymeric layer can be carried out with no significant detrimental effect on the image-bearing layer(s), even with color elements in which the images are dye images.

The term 'water-soluble' used herein means that at least 2 grams of the specified compound or composition dissolves in 1 liter of water within 2 hours at about 90° C.

The invention is further illustrated by the following examples of its practice.

EXAMPLE 1

An aqueous coating composition is prepared from 50 weight percent polyvinyl alcohol and 50 weight percent of a 50:30:20 mole percent mixture of glycidoxypropyltrimethoxysilane, tetraethylorthosilicate, and tetrabutylorthotitanate. In one test, Zonyl FSN, a fluoroalkyl polyether surfactant sold by DuPont, is added at 0.01 weight percent. In a second test, Zonyl FSN is added at 0.05 percent. Machine coatings are made at dry coverages of 100 (1076.4) milligrams/square foot (milligrams/square meter) on a polyethylene terephthalate polyester support. The support coating is subjected to scratch and abrasion tests. The scratch resistance tests are carried out in accordance with ANSI Test Method PH1.37-1977 wherein larger single arm scratch values represent increased scratch resistance. The abrasion test is a Taber cycle abrasion resistance test in accordance with the A.S.T.M. D1044 test method of the American Society for Testing and Materials, Philadelphia, PA., wherein lower values represent increased abrasion resistance. The paper clip friction tests were conducted in accordance with the procedures set forth in ANSI II 9.4-1988, wherein lower values represent good lubricity. The test results are shown in Table I below. It will be seen that the coatings having Zonyl FSN show improved abrasion resistance, scratch resistance, and lubricity, over the non-Zonyl FSN coating.

TABLE I

| % Zonyl FSN | Paper Clip Friction | Single Arm Scratch | Taber Abrasion 100 Cycles |
|---|---|---|---|
| 0 | 0.40 | 20 | 5.6 |
| 0.01 | 0.28 | 125 | 4.1 |
| 0.05 | 0.20 | 105 | 2.3 |

EXAMPLE 2

The procedure of Example 1 is repeated except that the aqueous coating solutions are prepared from 50 weight percent polyvinyl alcohol and 50 weight percent of 85/15 mole percent tetraethylorthosilicate/tetrabutylorthotitanate hydrolyzed with distilled water at weight ratios to water of 1:2.5, 1:3.5, and 1:5, with 0.05 percent Zonyl FSN and without Zonyl FSN. The results are shown in Table 2, below. The coating containing Zonyl FSN show good abrasion resistance, scratch resistance, and lubricity. Surprising and unexpected improvements in scratch resistance are evident in the coatings containing Zonyl FSN.

EXAMPLE 3

Aqueous coating solutions are prepared from 50 weight percent polyvinyl alcohol and 50 weight percent of 95/5 mole percent tetraethylorthosicate/tetrabutyltitanate and 100 mole percent tetraethylorthosilicate, with 0.05 percent Zonyl FSN. The coating composition containing 100 mole percent tetraethylorthosilicate precipitates from the aqueous coating solution whereas the coating composition containing 95/5 mole percent tetraethylorthosilicate/tetrabutyl-titanate does not precipitate from the aqueous coating solution.

TABLE II

| Weight Ratio With H2O | % Zonyl FSN | Paper Clip Friction | Single Arm Scratch | Taber Abrasion 100 Cycles |
|---|---|---|---|---|
| 1:2.5 | 0 | 0.36 | 20 | 1.0 |
| 1:2.5 | 0.05 | 0.36 | 90 | 1.0 |
| 1:3.5 | 0 | 0.42 | 25 | 0.9 |
| 1:3.5 | 0.05 | 0.34 | 95 | 0.8 |
| 1:5.0 | 0 | 0.38 | 25 | 0.8 |
| 1:5.0 | 0.05 | 0.34 | 90 | 1.1 |

EXAMPLE 4

The procedure of Example 1 is repeated except that the aqueous coating solutions are prepared from 50 weight percent polyvinyl alcohol and 50 weight percent of varying mole percents of hydrolyzed lower alkoxides ("sol-gels"), as described in Table 3 below, and 0.05 weight percent Zonyl FSN, with distilled water at weight ratios to water of 1:2.5, 1:3.5, and 1:5.0. The results are shown in Table 3. The results show good abrasion resistance, scratch resistance, and lubricity, especially at mole percents of methyltriethoxysilane of 30 percent or less in the sol-gel.

TABLE III

SOL-GEL (methyltriethoxysilane/tetraethylsilane/tetrabutyltitanate)/polyvinyl alcohol + 0.05% Zonyl FSN

| Mole % Monomer in SOL-GEL | Weight Ratio H2O | Paper Clip Friction | Single Arm Scratch | Taber Abrasion 100 Cycles |
| --- | --- | --- | --- | --- |
| 10/75/15 | 1:2.5 | 0.38 | 95 | 0.8 |
| 30/55/15 | 1:2.5 | 0.38 | 95 | 0.7 |
| 42.5/42.5/15 | 1:2.5 | 0.38 | 40 | 0.5 |
| 10/75/15 | 1:3.5 | 0.38 | 95 | 0.7 |
| 30/55/15 | 1:3.5 | 0.42 | 20 | 0.9 |
| 10/75/15 | 1:5.0 | 0.38 | 100 | 0.9 |
| 30/55/15 | 1:5.0 | 0.32 | 80 | 0.9 |
| 42.5/42.5/15 | 1:5.0 | 0.38 | 50 | 0.8 |

EXAMPLE 5

The procedure of Example 1 is repeated except that the aqueous coating solution is prepared from 50 weight percent of polyvinyl alcohol and 50 weight percent of a 10/75/15 mole percent mixture of hydrolyzed phenyltriethoxysilane or methyltriethoxysilane or glycidoxypropyltrimethoxysilane (one of these as indicated in Table 4 below) hydrolyzed tetraethylorthosilicate/hydrolyzed tetrabutylorthotitanate ("SOL-GEL") with and without 0.05 weight percent Zonyl FSN with distilled water at weight ratios to water of 1:1, 1:2.5, and 1:5 except that paper clip friction was not determined in two instances. The results are shown in Table 4. Solgels A and C with Zonyl FSN show improved scratch and abrasion resistance over Solgels A and C without Zonyl FSN. Solgel B with Zonyl FSN likewise exhibits good abrasion and scratch resistance.

TABLE IV

| SOL-GEL | % Zonyl FSN | Weight Ratio H2O | Paper Clip Friction | Single Arm Scratch | Taber Abrasion 100 Cycles |
| --- | --- | --- | --- | --- | --- |
| A | 0 | 1:5 | not measured | 20 | 1.7 |
| A | 0.05 | 1:5 | not measured | 30 | 1.8 |
| B | 0.05 | 1:2.5 | 0.38 | 95 | 0.8 |
| C | 0 | 1:1 | 0.40 | 20 | 2.6 |
| C | 0.05 | 1:1 | 0.30 | 90 | 1.9 |

A = 10:75:15 mole percent phenyltriethoxysilane:tetraethylorthosilicate:tetrabutylorthotitanate
B = 10:75:15 mole percent methyltriethoxysilane:tetraethylorthosilicate tetrabutylorthotitanate
C = 10:75:15 mole percent glycidoxypropyltrimethoxysilane:tetraethylorthosilicate:tetrabutylorthotitanate The invention has been described in detail with particular reference to preferred embodiments thereof, but it will be understood that variations and modifications can be affected within the spirit and scope of the invention.

What is claimed is:

1. An aqueous coating composition useful in forming cross-linked protective layers on photographic elements, such coating composition comprising:
   (a) a water-soluble hydroxylated polymer;
   (b) a hydrolyzed lower alkoxide or mixtures thereof, with the proviso that the hydrolyzed lower alkoxide is not a tetrafunctional silicon lower alkoxide alone or in mixture with a different tetrafunctional silicon lower alkoxide, wherein when said hydrolyzed lower alkoxide contains a tetrafunctional silicon lower alkoxide said hydrolyzed lower alkoxide comprises a mixture of said tetrafunctional silicon lower alkoxide with another hydrolyzed lower alkoxide that is not a tetrafunctional silicon lower alkoxide; and
   (c) a fluoroalkyl polyether surface active agent.

2. The aqueous coating composition of claim 1, wherein said water-soluble hydroxylated polymer comprises from about 10 to about 40 percent of hydroxyl containing monomer.

3. The aqueous coating composition of claim 1, wherein said water-soluble hydroxylated polymer is polyvinyl alcohol.

4. The aqueous coating composition of claim 1, wherein said hydrolyzed lower alkoxide comprises by weight proportion from about 0.5 parts to about 1.5 parts to one part of said water-soluble hydroxylated polymer.

5. The aqueous coating composition of claim 1, wherein said hydrolyzed lower alkoxide comprises by weight proportion from about 0.75 parts to about 1.25 parts to one part of said water-soluble hydroxylated polymer.

6. The aqueous coating composition of claim 1, wherein said hydrolyzed lower alkoxide comprises a titanium lower alkoxide.

7. The aqueous coating composition of claim 1, wherein said hydrolyzed lower alkoxide comprises a mixture of a tetrafunctional silicon lower alkoxide and a hydrolyzed lower alkoxide that is not a tetrafunctional silicon lower alkoxide wherein said hydrolyzed lower alkoxide that is not a tetrafunctional silicon lower alkoxide comprises a weight proportion of at least 5 mole percent of said mixture.

8. The aqueous coating composition of claim 1, wherein said hydrolyzed lower alkoxide comprises a mixture of methyltriethoxysilane, tetraethylsilane, and tetrabutyltitanate.

9. The aqueous coating composition of claim 8, wherein said methyltriethoxysilane comprises from about 5 mole percent to about 30 mole percent of said hydrolyzed lower alkoxide.

10. The aqueous coating composition of claim 1, wherein said fluoroalkyl polyether surface active agent comprises a mixture of compounds having the general formula

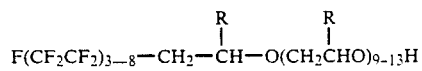

wherein R is hydrogen or methyl.

11. The aqueous coating composition of claim 1, wherein said fluroalkyl polyether surface agent is present in an amount of from about 0.01 to about 0.1 percent by weight of said aqueous coating composition.

12. The aqueous coating composition of claim 1, wherein said fluroalkyl polyether surface agent is present in an amount of from about 0.04 to about 0.06 percent by weight of said aqueous coating composition.

13. The aqueous coating composition of claim 10, wherein R is hydrogen.

14. A photographic element comprising
   (a) a support,
   (b) at least one image-forming layer on such support, and
   (c) a protective overcoat layer overlying the support side of said element, said protective overcoat layer comprising (1) a water-soluble hydroxylated polymer cross-linked by a hydrolyzed lower alkoxide or mixtures thereof, with the proviso that the hydrolyzed lower alkoxide is not a tetrafunctional silicon lower alkoxide alone or in mixture with a different tetrafunctional silicon lower alkoxide, wherein when said hydrolyzed lower alkoxide contains a tetrafunctional silicon lower alkoxide said hydrolyzed lower alkoxide comprises a mixture of said tetrafunctional silicon lower alkoxide with another hydrolyzed lower alkoxide that is not a tetrafunctional silicon lower alkoxide, and (2) a fluoroalkyl polyether surface active agent.

15. The photographic element of claim 14, wherein said hydrolyzed lower alkoxide comprises by weight proportion from about 0.5 parts to about 1.5 parts to one part of said water-soluble hydroxylated polymer.

16. The photographic element of claim 14, wherein said hydrolyzed lower alkoxide comprises by weight proportion from about 0.75 parts to about 1.25 parts to one part of said water-soluble hydroxylated polymer.

17. The photographic element of claim 14, wherein said hydrolyzed lower alkoxide comprises a titanium lower alkoxide.

18. The photographic element of claim 14, wherein said hydrolyzed lower alkoxide comprises a mixture of a tetrafunctional silicon lower alkoxide and a hydrolyzed lower alkoxide that is not a tetrafunctional silicon lower alkoxide wherein said hydrolyzed lower alkoxide that is not a tetrafunctional silicon lower alkoxide comprises a weight proportion of at least 5 mole percent of said mixture.

19. The photographic element of claim 14, wherein said hydrolyzed lower alkoxide comprises a mixture of methyltriethoxysilane, tetraethylsilane, and tetrabutyltitanate.

20. The photographic element of claim 19, wherein said methyltriethoxysilane comprises from about 5 mole percent to about 30 mole percent of said hydrolyzed lower alkoxide.

21. The photographic element of claim 14, wherein said water-soluble hydroxylated polymer comprises from about 10 to about 40 percent of hydroxyl containing monomer.

22. The photographic element of claim 14, wherein said water-soluble hydroxylated polymer is polyvinyl alcohol.

23. The photographic element of claim 14, wherein said fluoroalkyl polyether surface active agent comprises a mixture of compounds having the general formula

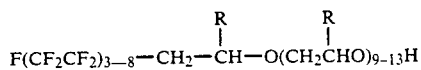

wherein R is hydrogen or methyl.

24. The photographic element of claim 14, wherein said fluroalkyl polyether surface agent is present in an amount of from about 0.01 to about 0.1 percent by weight of said overcoat layer.

25. The photographic element of claim 14, wherein said fluroalkyl polyether surface agent is present in an amount of from about 0.04 to about 0.06 percent by weight of said overcoat layer.

26. The photographic element of claim 23, wherein R is hydrogen.

* * * * *